Fig. 1.

Oct. 21, 1969  J. B. BRIGGS  3,474,449
PHASE ANGLE MEASUREMENT SYSTEM
Filed Nov. 1, 1967  4 Sheets-Sheet 2

JAMES B. BRIGGS
INVENTOR.

BY Lyon & Lyon
ATTORNEYS

Oct. 21, 1969               J. B. BRIGGS             3,474,449

PHASE ANGLE MEASUREMENT SYSTEM

Filed Nov. 1, 1967                                         4 Sheets-Sheet 3

FIG. 3A. 15 CPS SINE WAVE

FIG. 3B. 15 CPS 90°

FIG. 3C. 15 CPS 0°

FIG. 3D. 15 CPS 0° 40° GATE

FIG. 3E. 135 CPS SINE WAVE

FIG. 3F. 135 CPS 0°

FIG. 3G. 135 CPS 90°

FIG. 3H. 540 CPS

FIG. 3I. REFERENCE & AUX. REFERENCE

FIG. 3J. 15 CPS 40° GATE

FIG. 3K. 135 CPS

JAMES B. BRIGGS
INVENTOR.

BY    *Lyon & Lyon*

ATTORNEYS 3,474,449
PHASE ANGLE MEASUREMENT SYSTEM
James B. Briggs, La Canada, Calif., assignor to Hoffman Electronics Corporation, El Monte, Calif., a corporation of California
Continuation-in-part of application Ser. No. 557,441, June 14, 1966. This application Nov. 1, 1967, Ser. No. 683,085
Int. Cl. G01s 1/44
U.S. Cl. 343—106    35 Claims

ABSTRACT OF THE DISCLOSURE

A bearing computer for determining the bearing of a movable vehicle from a TACAN beacon by digital techniques. A pair of phase locked loops are locked with the fundamental and harmonic components of the bearing information waveform generated by the beacon and a coincidence circuit produces an output when the positive going zero crossings of the two components coincide. This output causes the count in a counter to be read out, the counter being reset upon the occurrence of a north reference pulse.

CROSS-REFERENCE TO OTHER APPLICATIONS

This application is a continuation-in-part of my application Ser. No. 557,441, filed June 14, 1966, entitled "Phase Angle Measurement System," now abandoned. Other applications which are related to the present application are: Ser. No. 557,558, filed June 14, 1966; Ser. No. 557,559, filed June 14, 1966, now Patent No. 3,354,455; and Ser. No. 557,509, filed June 14, 1966. All of these applications are assigned to the assignee of the present invention.

BACKGROUND OF THE INVENTION

Systems have been devised in the past for measuring phase angle and typically include some type of phase detection or phase shifting technique for locking onto the signal being measured. Such systems are not entirely satisfactory, particularly where it is necesary to measure the phase angle of a waveform with high accuracy and stability in the presence of another waveform and/or noise. Filtering circuits are used to filter or select the waveform of interest from other waveforms or noise. Additionally it is sometimes desirable to measure the phase of a number of components of a composite waveform. Filters are required in this instance to separate the components of interest prior to the phase measurement. Filtering prior to the phase measurement or measurements causes phase shifts and drifts which lead to inaccuracies and instabilities in measurement.

Accurate and stable measurements of phase angle are particularly important in radio air navigation systems, such as in the azimuth or bearing measuring portion of a TACAN (tactical air navigation) system. These systems measure both the range and bearing of an airplane with respect to a stationary ground beacon, and provide visual indications thereof to the pilot of the airplane. The signals involved in the measurements may be degraded by noise. A multi-channel receiver-transmitter and measuring system are provided on the airplane and operate with pulses to provide both range and bearing information. A number of ground beacons are available and each includes a transmitter and directional antenna for bearing information and in addition a receiver for range information.

For bearing measurements by a TACAN system, the beacon transmits a cardioid radiation pattern rotated at the rate of fifteen rotations per second, together with a reference signal. This cardioid pattern is produced by generating pulses and a sine wave results if the rotation pattern is converted into rectangular coordinates. This sine wave, which is received by the airborne receiver, is a fifteen cycle per second signal which provides a coarse indication of bearing. The beacon also generates nine secondary variations or ripples superimposed on the cardioid pattern. These secondary ripples provide a sine wave of 135 cycles per second superimposed on the 15 cycles per second sine wave. In typical TACAN systems, these sine wave components are separated by means of filter circuits in the airborne bearing measuring equipment, and phase comparator circuits then used to compare the phase of these components with corresponding components of the reference signal. An example of such a system may be found in U.S. Patent No. 2,890,449. The 15 cycles per second coarse signal provides a bearing indication within a 40 degree sector, and the 135 cycles per second signal provides a fine measurement within a sector. It will be appreciated that it is desirable to make phase angle measurements on the fine and coarse signals in an accurate and reliable manner in order to provide correspondingly accurate indications of bearing.

SUMMARY OF THE INVENTION

The present invention provides a system for cooperating with a TACAN beacon to digitally compute the bearing of a vehicle carrying the system with respect to the beacon, thus providing a more accurate and reliable indication of bearing than has heretofore been obtainable and permitting the entire apparatus of which the system is a part to be made smaller and lighter. The system determines bearing by measuring the time elapsed from the occurrence of a first event to the occurrence of a second, the time units being representative of bearing units, i.e., fractions of degrees. The first event at which the count begins is the receipt of a reference pulse, normally the north reference pulse, from the beacon. The second event, at which the count is read out, is the coincidence of predetermined points of the fundamental and harmonic components of the bearing information waveform, normally their positive going zero crossings. The circuitry of the system includes a pair of phase locked loops for tracking these components which serve as coarse (fundamental) and fine (harmonic) increments to respectively measure the bearing sector within which the vehicle lies and to provide resolution within the sector. The system also includes a reference phase locked loop and means for deriving meaningful information from the coarse loop in the event a fine signal is not present.

Accordingly, it is an object of the present invention to provide a system for accurately measuring phase angle.

It is another object of the present invention to provide a digital measurement of bearing in a TACAN system.

It is an additional object of the present invention to provide a system for measuring the phase angles of components of a composite waveform.

A further object of the present invention is to provide a system employing multiple phase locked loops to track the phase of each component of a composite input signal.

Another object of the present invention is to provide a system employing multiple phase locked loops to track the phase of each component of a composite input signal without the requirements of signal separating filters ahead of the loops.

A still further object of the present invention is to provide a system for tracking the components of a composite signal in an air navigation system and which employs received reference pulses in a novel manner.

These and other objects and advantages of the present invention will become more apparent upon reference to the accompanying description and drawings in which:

Figure 1:
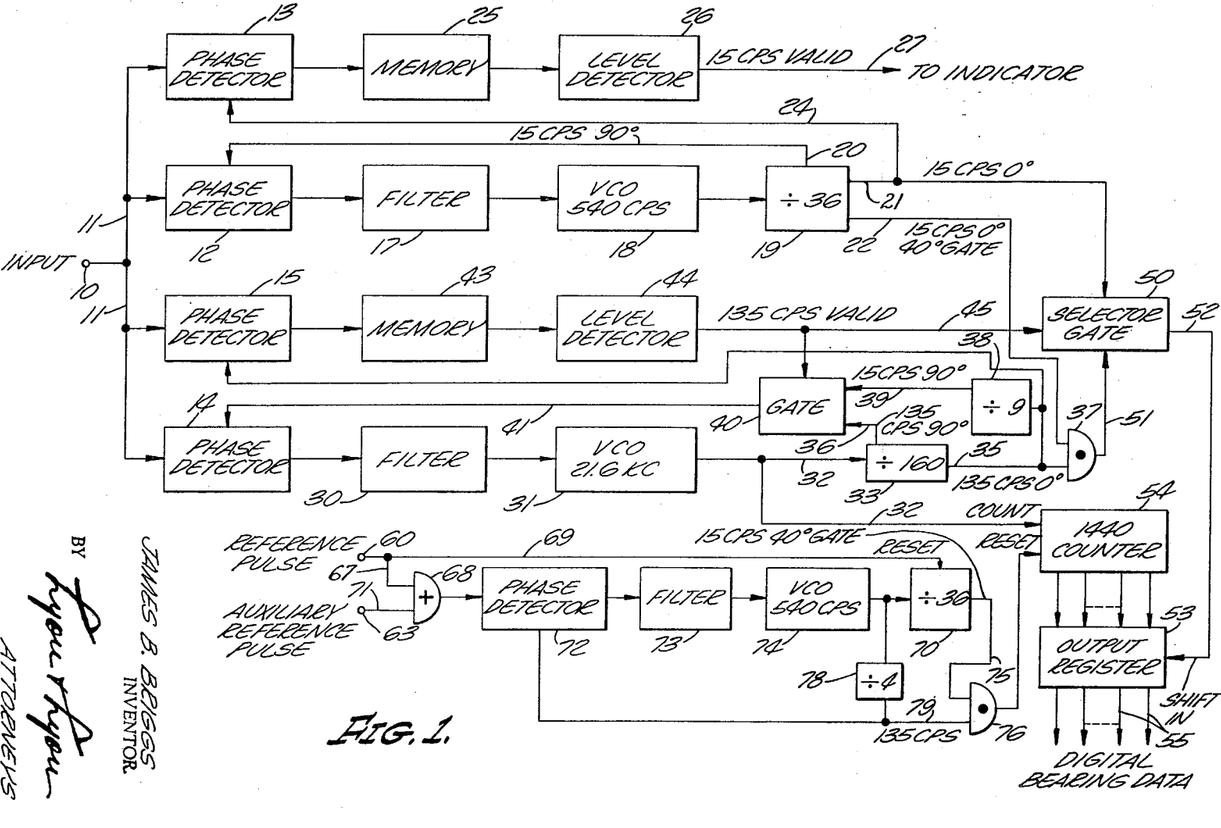
FIGURE 1 is a block diagram of a phase angle measuring system according to a first embodiment of the present invention.

Turning now to the drawings, FIGURE 1 illustrates a first embodiment of a system according to the present invention for measuring the phase angle of signals. Although not intending to be limited thereby, this system will be described in the environment of a radio air navigation system, such as a TACAN system, for measuring the azimuth or bearing of an airplane with respect to a beacon. The beacon may be, for example, a ground beacon, a ship beacon or another airplane acting as a beacon. As used hereinafter, the term "beacon" is meant to include all such transmitting stations. For such use, a system of the nature shown in FIGURE 2 which may include the system illustrated in FIGURE 1, is carried by the airplane.

Figure 2:
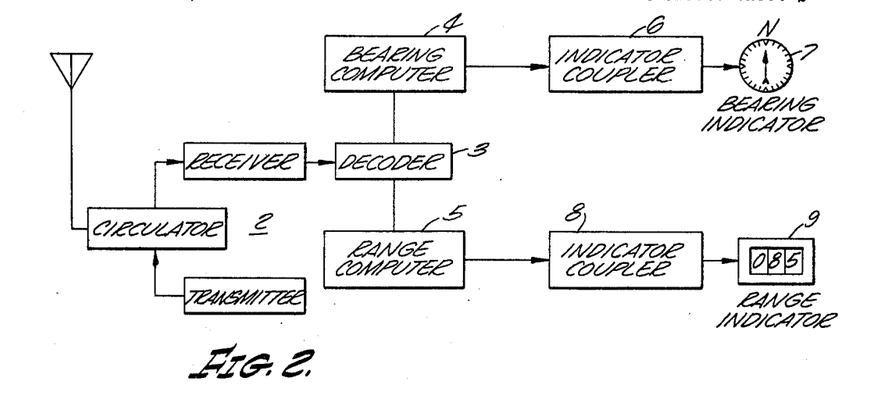
FIGURE 2 illustrates generally an airborne radio air navigation system.

The system shown in FIGURE 2 generally illustrates that portion of a TACAN system carried by the airplane and includes a transmitting and receiving subsystem generally indicated by a reference numeral 2. This latter subsystem may include an antenna coupled with a circulator which directs RF energy to be transmitted from a transmitter to the antenna and directs RF energy received by the antenna to a receiver. Received signals are applied to a decoder 3 which in turn supplies signals to a bearing computing system 4 and a range computing system 5. The decoder 3 serves to supply the appropriate received signals to either the bearing computing system 4 or the range computing system 5.

The decoder 3 may include a circuit for following the peak amplitude of received pulses to provide a composite waveform proportional to the peaks of the received pulses to the bearing computing system 4. A particularly suitable circuit which may be used for generating the composite waveform is shown and described in copending U.S. patent application Ser. No. 557,558 entitled "Pulse Amplitude Measurement System" filed June 14, 1966 by applicant, the disclosure of which is incorporated herein by reference.

The bearing computing system 4, which may take the form of the system shown in FIGURE 1, is coupled through an indicator coupler 6 to a bearing indicator 7 to provide a visual indication of bearing to the pilot of the airplane. The range computing system 5 is coupled through an indicator coupler 8 to a range indicator 9 which serves to provide a visual indication of range to the pilot of the airplane. The range computing system 5 may be of the nature of the system shown and described in copending U.S. patent application Ser. No. 557,559 entitled "Digital Delay Measurement System" filed June 14, 1966 by James B. Briggs and Marvin P. Vander Plaats, the disclosure of which is incorporated herein by reference. Each of the indicator couplers 6 and 8 may take the form of the system shown and described in copending U.S. patent application Ser. No. 557,509 entitled "Digital to Analog Servo System" filed June 14, 1966 by applicant, the disclosure of which is incorporated herein by reference.

It will be appreciated that although a system according to the present invention is particularly useful for bearing measurements in an air navigation system, various applications are possible where accurate and reliable measurements of phase angle are required.

Turning again to FIGURE 1, the system shown therein includes an input terminal 10 connected through a line 11 to four phase detectors 12 through 15. A composite waveform including, for example two signals of different frequency, is applied to the terminal 10. The phase detector 12 forms a part of a coarse phase locked loop, and the phase detector 14 forms a part of a fine phase locked loop. The coarse and fine loops may respectively serve to measure and phase lock with the two signals of the composite waveform. The output of the phase detector 12 is connected through a low pass filter 17 to control a voltage controlled oscillator 18. The output of the phase detector 12 is a D.C. voltage proportional to phase difference, and the filter 17 removes the A.C. components therefrom. The resulting D.C. error voltage controls the oscillator 18. The output of the oscillator 18 is connected to a digital divider 19. This divider 19 may include a conventional binary counter for performing the division which in turn drives flip flops to provide the necessary output pulses.

In an air navigation system, the composite waveform may include a 135 cycles per second "fine" signal superimposed on a 15 cycles per second "coarse" signal, such as a composite waveform shown in FIGURE 4B which will be explained in greater detail subsequently. In this case, the coarse loop including the phase detector 12 may be responsive to the 15 cycles per second signal, with the voltage controlled oscillator 18 providing a normal output of 540 cycles per second and the divider 19 providing a feedback signal of 15 cycles per second signal on a line 20 to the phase detector 12. The phase detector 12 produces a D.C. voltage in a conventional manner proportional to a phase error between the input and feedback signals. In this arrangement, the phase detector 12 provides a zero error output signal when the feedback signal is 90 degrees out of phase (in quadrature) with the input signal. The counter 19 also provides a 15 cycles per second output signal (15 c.p.s. 0°) on a line 21 which is in phase with the input signal applied to the phase detector from the line 11 when the loop locks on this input signal. The counter 19 aditionally provides a gate pulse output (15 c.p.s. 0°, 40° gate) on a line 22 which is forty degrees wide and is used to "bracket" the positive going zero crossing of the output signal on the line 21, this latter output signal being in phase with the input 15 c.p.s. signal on the line 11 as described above.

Figure 3A:
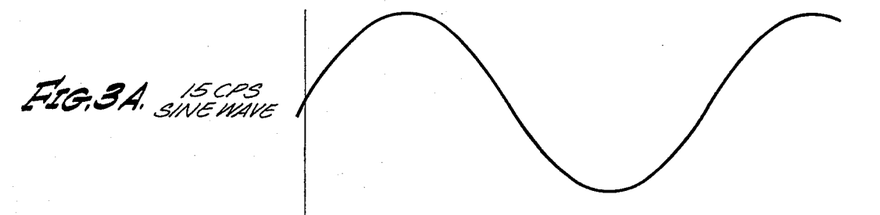
FIGURE 3A through K illustrate various waveforms which are involved in the operation of the system of FIGURE 1.
Figure 3B:
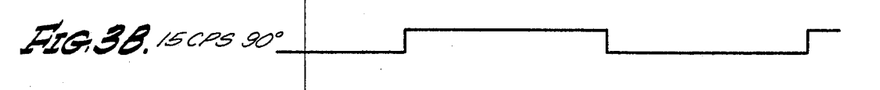
Figure 3C:
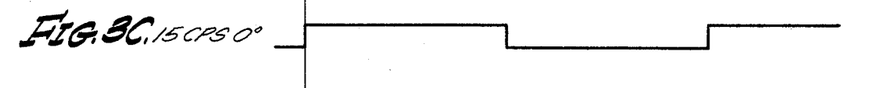
Figure 3D:
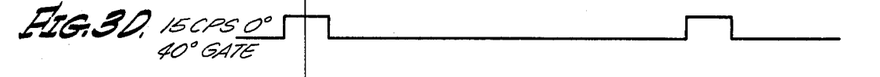

FIGURE 3A illustrates the 15 cycles per second signal component of the composite input waveform and this signal may be a sine wave as shown, or a square wave; FIGURE 3B illustrates the 15 cycles per second 90 degree out of phase signal on the line 20; FIGURE 3C illustrates the 15 cycles per second in-phase signal on the line 21; and FIGURE 3D illustrates the forty degree gate signal on the line 22.

The divider 19 may be constructed of a conventional ring counter to provide the various outputs, but this type of counter would necessitate the use of thirty-six bistable stages.

Thus the divider 19 uses a binary counter which has six stages to count input pulses 1 through 36 from the oscillator 18 and recycle. The first four stages divide the 540 c.p.s. signal by nine providing a 60 c.p.s. signal. The next stage divides by two and the last stage divides by two. Thus, each 36th pulse corresponds to the positive going zero crossing, or beginning, of the input 15 cycles per second wave. Any of the output pulses from the counter 19 may be derived in a conventional manner by using the outputs of selected stages of the counter to set and reset flip flops. Thus, the 15 cycles per second in-phase (15 c.p.s. 0°) is derived from the thirty-sixth count and used to set a flip flop, and the eighteenth count is used to reset this flip flop. This provides a square wave pulse beginning at 360° (also 0°) and ending at 180° as shown in FIGURE 3C. The 15 cycles per second pulse on the line 20, which is 90° out of phase, is derived by using the ninth count to set another flip flop and the twenty-seventh count to reset this flip flop thereby giving a square wave pulse beginning at 90° and terminating at 270°. The forty degree wide gate pulse on the line 22 is derived by using the thirty-fourth count to set a flip flop and the second count to reset this flip flop thereby giving an output pulse beginning at 340° and ending at 20°. The other dividers, which will be discussed subsequently, used in the system of FIGURE 1 may be constructed and operated in a similar manner.

The 15 cycles per second in-phase signal on the line 21 is applied through a line 24 to a second input of the phase detector 13. This phase detector provides a maximum output in a conventional manner for in-phase signals. The output of the phase detector 13 is applied through a memory 25 to a level detector 26, the output of which provides a 15 cycles per second "valid" signal on an output line 27. The phase detector 13, memory 25 and level detector 26 function as a "coarse," or 15 cycles per second, amplitude detector. The memory 25 may simply consist of a resistance-capacitance circuit to maintain an output signal from the memory even though the input signal may be lost for a short time, for example, five seconds. The input signal may be lost, for example, in an air navigation system when some obstruction exists between the airplane and the beacon. The level detector is a conventional circuit and serves to provide a binary output indicative of whether or not the output of the memory 25 is above or below a predetermined level. The output of the level detector may be applied through the line 27 to an alarm device, or the like, to indicate the presence or loss of the coarse signal.

The fine phase locked loop is similar to the coarse loop discussed above, and includes the phase detector 14 which is connected through a low pass filter 30 similar to the filter 17 to control a voltage controlled oscillator 31. The output of the oscillator 31 is connected through a line 32 to a digital divider 33 which may be similar to the divider 19 discussed above. In the present illustrative embodiment, the divider 33 is larger than the divider 19 since the input signal thereto is divided by a larger number. In a navigation system, for example, the oscillator 21 may provide a normal output of 21.6 kilocycles, and the divider 33 has eight stages which enable it to divide by 160 to provide 135 cycles per second output. The divider 33 thus provides a 135 c.p.s. in-phase output on a line 35, and a 135 c.p.s. 90 degrees out of phase signal on a line 36. The output line 35 is connected to an input of an "and" gate 37 along with the line 22 from the divider 19 in the coarse loop for reasons which will be explained in greater detail subsequently. The output line 35 also is connected to the input of a digital divider 38, similar to the divider 19, but having only four stages which provides an output 15 c.p.s. 90 degrees out of phase signal on an output line 39. The lines 36 and 39 are connected to inputs of a gate 40 which serve to pass either one or the other of these input signals to an output line 41 which in turn is connected in a feedback relationship with an input of the phase detector 14. The gate 40 enables the fine loop to lock on the 135 c.p.s. component of the input waveform applied on the line 11 if this component is present, but enables the fine loop to lock on the 15 c.p.s. signal if the 135 c.p.s. signal component is not present.

The output line 35 from the divider 33 also is connected to an input of the phase detector 15 which provides a maximum output when the loop output on the line 35 is in phase with the 135 c.p.s. component of the input waveform. The output of the phase detector 15 is coupled through a memory 43 to a level detector 44. As in the case of the coarse loop, the phase detector 15, memory 43 and level detector 44 function as a "fine," amplitude detector. The memory 43 may simply consist of a resistance-capacitance circuit to maintain an output signal from the memory even though the input signal may be lost for a short time, for example, five seconds. The level detector 44 is a conventional circuit and serves to provide a binary output indicative of whether or not the output of the memory 43 is above or below the predetermined level. When the output of the level detector 44 is above the predetermined level, it provides a "valid" output signal on a line 45 indicating that the fine loop has locked onto the 135 c.p.s. input signal. When this line is true (valid) the gate 40 is enabled to pass the 135 c.p.s. 90 degrees out of phase signal on the line 36 through the line 41 to the input of the phase detector 14, and if false (not valid) the 15 c.p.s. 90 degrees out of phase signal is passed.

Figure 3E:
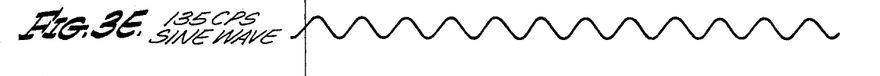
Figure 3F:
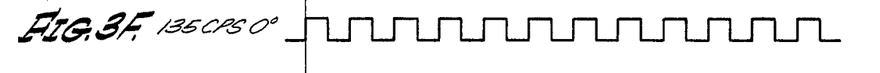
Figure 3G:
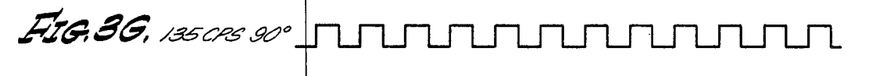
Figure 3H:
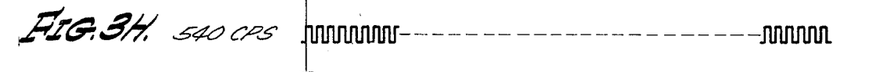

FIGURE 3E illustrates the 135 cycles per second signal component of the composite input waveform and this signal may be a sine wave as shown, or a square wave; FIGURE 3F illustrates the 135 cycles per second in-phase signal on the line 35; FIGURE 3G illustrates the 135 cycles per second 90 degrees out of phase signal on the line 36; and FIGURE 3B also shows the 15 cycles per second 90 degrees out of phase signal on the line 39.

The output line 21 of the divider 19 is connected to an input of a selector gate 50. The output line 45 from the level detector 44 and an output line 51 from the "and" gate 37 also are connected as inputs to the selector gate 50. The selector gate 50 serves to provide on an output line 52 signals indicative of positive going zero crossings of the 135 c.p.s. input signal component if present, or the 15 c.p.s. input singal if the 135 c.p.s component is not present This output on the line 52 essentially is a series of pulses occurring 15 times per second. Thus, if the input to the gate 50 on the line 45 is true (valid), the gate 50 passes the signals on the line 51 to the output line 52. Inasmuch as the inputs to "and" gate 37 are the 40 degree gate on the line 22 as shown in FIGURE 3D and the 135 c.p.s. in-phase signal shown in FIGURE 3F, the gate 37 provides an output at positive going zero crossing of the input 15 c.ps. wave (which corresponds to one of the positive going zero crossings of the 135 c.p.s. input component). The 40 degree gate essentially selects the proper positive going zero crossing of the 135 c.p.s. in-phase signal since nine of these occur for each positive going zero crossing of the 15 c.p.s. input signal. If the line 45 provides a false (not valid) input to the gate 50, the gate 50 passes the 15 c.p.s. in-phase signal from the line 21 to the ouput line 52. This signal likewise provides an indication as provided by the "and" gate 37. The pulses representing positive going zero crossings on the line 52 are applied to a register 53 to shift the contents of a counter 54 in parallel into the register 53.

The counter 54 counts the output of the voltage controlled oscillator 31 which is applied through the line 32 to the count input of the counter 54. The counter 54 counts to 1440 counts and recycles. As will appear subsequently, the counter 54 is reset to zero at a reference time, and then counts the input signals applied on the line 32. The counter 54 then effectively counts one-fourth of one degree increments, and when a positive going zero crossing occurs as indicated by the signal on the line 52, the contents of the counter 54 are shifted into the output register 53. The outjut register 53 stores this number which may be read out on output lines 55 to give an indication of the bearing of the airplane with respect to a beacon. Thus essentially the counter 54 counts one-fourth of one degree increments starting from a reference time, and the counter 54 is read out at the true bearing. The 21.6 kilocycles output of the osciallator 31 provides 1440 pulses for each revolution (1440 times 15 equals 21.6 kc.) of the antenna of the beacon. The antenna rotates at the rate of fifteen times per second. This arrangement enables resolution of one-fourth of one degree to tbe obtained in bearing measurements (360 degrees time 4 equals 1440).

A reference phase locked loop is provided and is employed to reset the counter 54 at a proper reference time. This loop includes an input terminal 60 for receiving reference pulses, such as north reference pulses 61, 62, etc., shown in FIGURE 3I, and an input terminal 63 which receives auxiliary reference pulses 64, 65, etc., shown in FIGURE 3I. These reference pulses are typically 180 microseconds wide and are generated in response to reference pulse bursts transmited by the beacon in a navigation system with the north reference pulses occurring 15 times per second, and the auxiliary reference pulses occurring 120 times a second, for a total of 135 pulses per second. A north reference pulse is generated when the positive going zero crossing of the 15 c.p.s. signal 84 in FIGURE 4A is pointing south. No auxiliary reference pulses is generated when a north reference pulse is generated.

The terminal 60 is connected through a line 67 to the input of an "or" gate 68, and through a line 69 to the reset input of a digital divider 70. The divider 70 is similar to the divider 19. The terminal 63 is connected through a line 71 to the "or" gate 68. The output of the "or" gate 68 is connected to an input of a phase detector 72 which may be similar to the phase detectors 12 through 15. The output of the "or" gate is essentially a string of reference pulses as shown in FIGURE 3I arriving 135 times per second since both the north and auxiliary reference pulses pass through the gate 68.

The output of the phase detector 72 is connected through a low pass filter 73 to the input of a voltage controlled oscillator 74. In the present exemplarly embodiment, the oscillator may have a normal output frequency of 540 c.p.s. The output of the oscillator 74 is connected to the divider 70 which in turn provides a 15 c.p.s. 40 degree gate output as shown in FIGURE 3J in the same manner as the divider 19. This gate output is applied through a line 75 to the input of an "and" gate 76. The output of the oscillator 74 also is connected to a digital divider 78 which in turn provides a 135 c.p.s. output on a line 79. The line 79 is connected to an input of the "and" gate 76, and fed back to an input of the phase detector 72. The loop including the phase detector 72, filter 73 oscillator 74 and divider 78 functions to lock on the input reference pulses in a conventional manner. The error output of the phase detector 72 is zero when the leading edges of the 135 c.p.s. feedback signal on the line 79 occur at the center of the reference pulses.

Figure 3I:
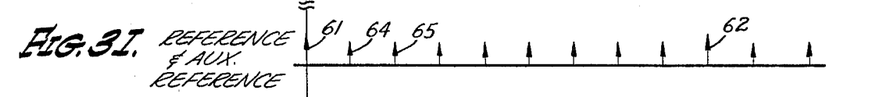
Figure 3J:
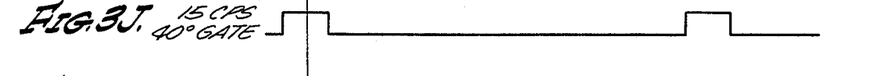
Figure 3K:
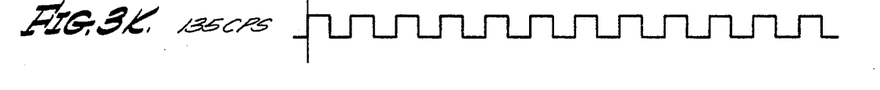
Figure 4A:
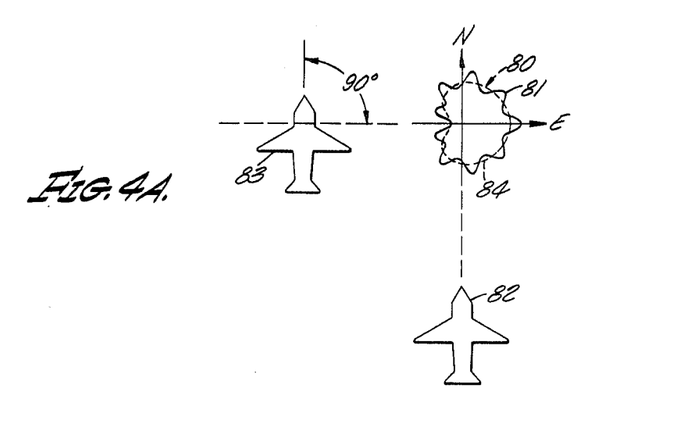
FIGURE 4A illustrates the radiation pattern generated by a typical beacon of an air navigation system.

The reference pulses shown in FIGURE 3I occur at a random time with respect to the signals shown in FIGURES 3A through 3H. This is, the ordinates, or Y axes, of these curves are not necessarily the same. This depends upon the bearing of the airplane with respect to the beacon, and if the bearing is zero the signals shown in FIGURE 3A through 3K fall upon a common ordinate. The reference phase locked loop serves to adjust the phase of the 135 signal on the line 79 with respect to one of the reference pulses (north or auxiliary) shown in FIGURE 3I. The reference pulses illustrated in FIGURE 3I are generated in response to reference pulse bursts transmitted by the beacon. The airborne receiver receives these bursts and applies them to the decoder (note FIGURE 2) which in turn generates the pulses shown in FIGURE 3I. In air navigation system, for example, the pulse burst received may consist of several pairs of pulses with the pulses of a pair spaced twelve microseconds apart and the pairs spaced 30 microseconds apart, with the decoder generating a reference pulse having a duration of one-hundred and eighty microseconds in response to the burst. The decoding of the reference pulse bursts may be accomplished in various ways, and conventional counting techniques may be employed for this purpose. That is, a counter may be used to decode or recognize the pulse burst pattern. A binary counter which counts to 30 and recycles may be used for detecting such pulse bursts and providing the reference pulses as shown in FIGURE 3I. The counter may start counting clock pulses upon the occurrence of a first pulse of a pair and count for 12 microseconds as described above. If a second pulse of the pair is not received the counter is reset to zero. If a second pulse is received, this indicates that the two received pulses represent a pair and the counter continues counting for a total of 24 microseconds from the beginning. If another pulse is received, an auxiliary flip flop may be set indicating that this pulse corresponds to an auxiliary reference pulse burst used in bearing measurements. If a pulse is not received at this time, the counter continues counting to a total of 30 microseconds from the beginning, and if a pulse is received a north reference flip flop may be set indicating that this pulse is one of the north reference pulses used in bearing measurements. The counter then may be reset and start the preceding cycle over again.

The north reference pulse applied to the line 69 serves to reset the divider 70 to adjust the phase of the 40 degree gate to properly bracket a north reference pulse rather than just any of the pulses shown in FIGURE 3I. This arrangement enables the north reference pulse to lock the reference loop onto the north reference pulse. Generally, the circuit can lock with a single north reference pulse. However, in order to insure increased reliability each north reference pulse resets the divider 70 to maintain the system locked in the event some reference pulses do not occur. The output of the "and" gate 76 is indicative of the zero reference time of the beacon and is used to reset the counter 54 as described previously. Hence, the reference pulses essentially provide a zero reference against which the phase of the fine and coarse signals may be compared. The reference loop also serves to fill in reference pulses which are used for comparison purposes. The reference loop corrects the synthetic pulse's position if it is in error. Thus, the reference loop serves to provide synthetic zero reference pulses when no reference bursts are received, serves to continually correct the time position of these reference pulses (as well as adjust the frequency thereof), and averages the position of the received reference pulse bursts. Inasmuch as a number of reference pulses may be generated per revolution of the beacon antenna, the reference loop may take the average position of the several pulses to generate the synthetic reference pulse. This is particularly advantageous when one or several of the received reference pulse bursts have been degraded in some way which might cause a false reference.

FIGURE 4A illustrates a cardioid pattern 80, with secondary variations 81 generated by a typical beacon of an air navigation system. Two airplanes 82 and 83 are illustrated at respective bearings of zero degrees and 90 degrees with respect to the beacon. The positive going zero crossing of the cardioid pattern 80 is indicated by a reference numeral 84.

Figure 4B:
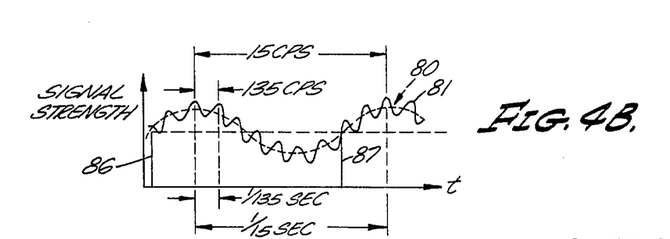
FIGURE 4B illustrates the resultant pattern in rectangular coordinates of the radiated beacon pattern.

FIGURE 4B shows the radiation pattern generated by the beacon converted into rectangular coordinates. It can be seen from FIGURE 4B that the antenna of the beacon generates a composite waveform having a 15 c.p.s. signal 80 and a 135 c.p.s. signal 80 and a 135 c.p.s. signal 81 superimposed thereon. The composite waveform is actually generated by plural pulses of varying amplitude. These pulses are received by the airborne receiver and decoded to provide a composite waveform as shown in FIGURE 4B. This composite waveform is applied to the terminal 10 of the system according to the present invention shown in FIGURE 1. Also shown are north reference pulses 86 and 87 generated in response to north reference bursts from the beacon at the positive going zero crossings of the 15 c.p.s. signal, and these pulses may correspond ot pulses 61 and 62 in FIGURE 3I. The auxiliary reference pulses are not shown for simplicity of illustration.

The coarse and fine phase lock loops lock onto the respective 15 c.p.s. and 135 c.p.s. components of the composite waveform as described previously. Initially, the coarse loop locks onto the 15 c.p.s. signal until a sufficient number of 135 c.p.s. signals cause the output of the lever detector 44 to go true. The time, typically five seconds, required for this to occur is determined by the time constant of the memory 43. When the line 45 from the lever detector 44 goes true, the selector gate 50 is enabled to pass the output of the "and" gate 37 through the gate 50 to the output line 52 thereof. The signal on the line 52 represents positive going zero crossings of the 15 c.p.s. component essentially synchronized by the "and" gate 37 with the positive going crossings of the 135 c.p.s. component. The output of the line 52 occurs 15 times per second, each pulse on this line causes the contents of the counter 54 to shift into the output register 53. If the bearing of the airplane with respect to the beacon is zero degrees, as indicated by the airplane 82 in FIGURE 4A, the counter 54 is reset (which occurs at the beacon reference time) at the same time the contents of the counter 54 are shifted into the register 53. In this case the register 53 provides a zero output indicating a zero degree bearing of the airplane from the beacon, i.e., the airplane 82 is due south of the beacon. This corresponds to a bearing of the beacon from the airplane of due north. If the airplane has another bearing with respect to the beacon, such as the airplane 83 shown at 90 degrees with respect to the beacon in FIGURE 4A, (1) the counter 54 is reset, (2) this counter counts the input signals on the line 32, and (3) the contents of the counter 54 are transferred to the register 53 upon the occurrence of the next positive going zero crossing, which occurs after a 90 degree rotation of the beacon antenna in this case. Inasmuch as each pulse on the line 32 represents one-fourth of one degree (the resolution of the system) the counter 54 counts 360 pulses, which correspond to 90 degrees (360 divided by four), between the time of reset and shift of its contents into the register 53. A digital output of the register 53 may then be used to operate a visual read out or other equipment to indicate a 90 degree bearing.

In some instances, some beacons may not generate the 135 c.p.s. signal, or this signal may be lost, such as when flying over the beacon. In this event, the gate 40 is switched by a false (not valid) signal on line 45 and passes 15 c.p.s. 90 degrees out of phase signal from the divider 38 to the input of the phase detector 14. The phase detector 14 then locks onto the coarse 15 c.p.s. input signal. However, the oscillator 31 still provides its normal output of 21.6 kilocycles when the loop is locked, and thus applies this same output to the count input of the counter 54.

The coarse loop operating at 540 c.p.s. provides 10 degrees resolution and the fine loop operating at 21.6 kc. provides ¼ of one degree resolution. Although the fine resolution could be provided by a single loop with switching means to switch from 15 c.p.s. to 135 c.p.s., during the time the loop is operating at 135 c.p.s., no coarse (15 c.p.s.) data would be available thereby creating difficulties in locking the system onto the correct coarse bearing sector (40 degrees). Accordingly, the system illustrated in FIGURE 1 provides a relatively simple and accurate arrangement for utilizing both coarse and fine information to provide good resolution, while still providing a useful output even in the absence of the fine signal. The use of a north reference pulse to properly lock the reference loop is additionally important in providing accuracy.

Figure 5:
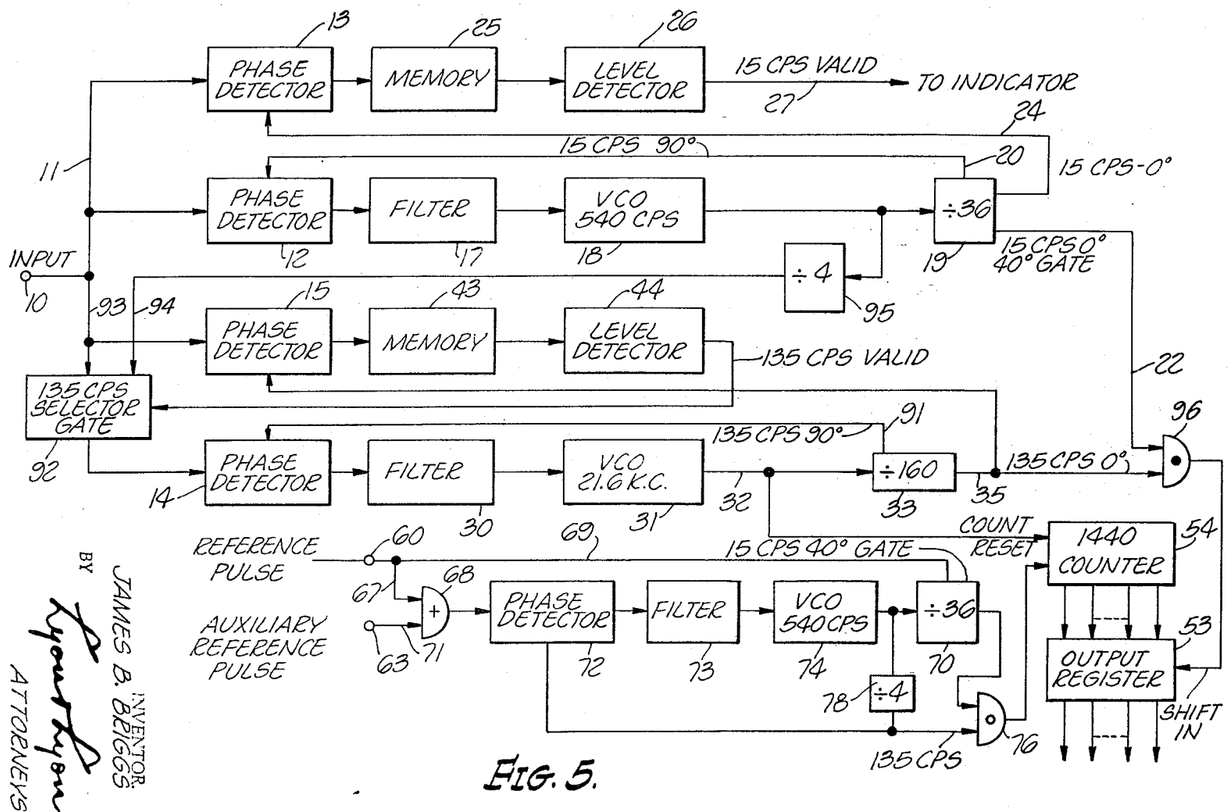
FIGURE 5 is a block diagram of a phase angle measuring system according to a second embodiment of the present invention.

Turning now to FIGURE 5, there is shown a preferred embodiment of a system according to the present invention. In this figure, elements similar to those shown in FIGURE 1 will be identified by the same reference numerals. The main differences between the system of FIGURE 5 and that of FIGURE 1 is the manner in which the system operates when no 135 c.p.s. component is present. As can be seen from FIGURE 5, the circuitry for detecting the amplitude of the 15 c.p.s. component comprising the phase detector 13, the memory 25, and the level detector 26 is identical to that shown in FIGURE 1, as is the phase locked loop for the 15 c.p.s. component comprising the phase detector 12, the filter 17, the voltage controlled oscillator 18 and the divider 19. Also identical to that shown in FIGURE 1 is the reference phase locked loop and the counter and output register combination.

The phase locked loop for the 135 c.p.s. component is quite similar to that shown in FIGURE 1 but the 90 degree out of phase signal produced by the divider 33 is fed back directly to the phase detector 14 along a line 91. The input to the phase detector 14 is not directly taken from the input terminal 10 but is rather provided by a 135 c.p.s. selector gate 92 which has a first input connected to the input terminal 10 by a line 93 and a second input connected by a line 94 to a counter 95 whose input is connected to the output of the voltage controlled oscillator 18 and which divides this output by 4, thus producing a 135 cycles per second output.

The amplitude detecting circuitry for the 135 c.p.s. component is similar to that shown in FIGURE 1 and comprises phase detector 15, memory 43 and level detector 44, the inputs to the phase detector 15 being connected to the input terminal 10 and the output of the divider 33. However, the output of the level detector 44 is connected to the control input of the selector gate 92 and determines whether the selector gate 92 will pass the signal appearing on the input line 93 or the input line 94.

The 15 c.p.s. 0°–40° gate output of the counter 19 appearing on the line 22 is fed to one input of an "and" gate 96, the other input of which is connected to the output of the counter 33, that is, the 135 c.p.s. 0° signal appearing on the line 35. The output of the "and" gate 95 is connected to the shift input of the output register 53.

The operation of the system shown in FIGURE 5 is basically similar to that shown in FIGURE 1. However, certain differences are apparent. Instead of locking the 135 c.p.s. phase locked loop onto a 15 c.p.s. signal if the level detector 44 indicates that the 135 c.p.s. signal is not present, the system of FIGURE 5 locally generates a 135 c.p.s. signal from the 15 c.p.s. phase locked loop by means of the counter 95. The 135 c.p.s. phase locked loop thus always looks at a 135 cycles per second signal regardless of whether the 135 c.p.s. component is present in the input to the system. The selection of whether the input signal or the locally generated signal is fed to the 135 c.p.s. phase locked loop is controlled by the selector gate 92 which is in turn controlled by the level detector 44.

Thus, if the 135 c.p.s. component of the input signal is above the predetermined value, the input terminal 10 is connected by the selector gate 92 to the phase detector 14. If, on the other hand, the 135 c.p.s. component of the input signal is below the predetermined value, the selector gate 92 connects the phase detector 14 to the output of the counter 95. Since only a 135 c.p.s. signal is applied to the phase locked loop, the components thereof can be optimized for this single frequency rather than having to be serviceable at both 15 c.p.s. and 135 c.p.s. In addition, since the selection of the bearing information waveform component to be followed is made at the input, if only a 15 c.p.s. component is present, two stage filtering is obtained, that is, the two phase locked loops are in series with the result that better performance is obtained. Since the selector gate on the output is eliminated, the 15 c.p.s. 0°–40° gate on the line 22 and the 135 c.p.s. 0° signal on the line 35 can be applied directly to the "and" gate 96. When these inputs to the "and" gate conicide, a signal is produced which causes the contents of the counter 54 to be shifted to the output register 53. As before, the counter 54 is reset upon the occurrence of an output from the "and" gate 76.

While the present invention has been described in connection with use in a radio air navigation system, it should be understood that other applications are possible. The invention, therefore, may be embodied in other forms not departing from the spirit or central characteristics thereof. The present embodiments are to be considered in all respects as illustrative and not restrictive, the scope of the invention being indicated by the appended claims rather than by the foregoing description and all changes which come within the meaning and range of equivalency of the claims are therefore intended to be embraced thereby.

What is claimed is:

1. A bearing computing system for determining the bearing of a vehicle from a TACAN beacon or the like generating a composite bearing waveform having fundamental and harmonic components and a reference signal, comprising:
   means for detecting said composite bearing waveform, said means including individual phase locked loop means for locking with the fundamental and harmonic components thereof;
   coincidence means coupled to said phase locked loop means for producing an output signal upon the coincidence of predetermined points of said fundamental and harmonic components of said waveform, the production of said output signal being a first event;
   means for detecting said reference signal, the detection of said reference signal being a second event; and
   means for computing said bearing as a function of the elapsed time interval between the respective occurrences of said events.

2. A bearing computing system for determining the bearing of a vehicle from a TACAN beacon or the like generating a composite bearing waveform having fundamental and harmonic components and a reference signal, comprising:
   means for detecting said composite bearing waveform, said means including individual phase locked loop means for locking with the fundamental and harmonic components thereof;
   coincidence means for producing an output signal upon the coincidence of predetermined points of said fundamental and harmonic components of said waveform;
   a source of pulses;
   counting means for counting said pulses;
   means coupled to said coincidence means and to said counting means for detecting the count in said counting means upon the production of said output signal;
   means for detecting said reference signal; and
   means coupling said reference signal detecting means to said counting means for resetting said counting means upon detection of said reference signal.

3. The system as in claim 2 wherein:
said means for detecting said reference signal includes an additional phase locked loop means for locking with said reference signal and producing an output in said reference signal and producing an output in phase therewith.

4. The system as in claim 2 wherein:
means are provided for causing both of said phase locked loop means to lock with said fundamental component of said bearing waveform in the event said harmonic component is not present.

5. The system as in claim 2 wherein:
said source of pulses comprises oscillator means in the phase locked loop means locked to said harmonic component of said bearing waveform.

6. The system as in claim 5 wherein:
the frequency of said oscillator means is substantially greater than the frequency of said harmonic component of said bearing waveform.

7. A bearing computing system for determining the bearing of a vehicle from a TACAN beacon or the like generating a composite bearing waveform having fundamental and harmonic components and a reference signal comprising a series of pulses comprising:
   input means for receiving said composite waveform;
   first phase locked loop means coupled to said input means for locking with the fundamental component of said bearing waveform, said first phase locked loop means having means for providing a gate output pulse which exists in time with a predetermined point of said fundamental component;
   second phase locked loop means coupled to said input means for locking with the harmonic component of said bearing waveform, said second phase locked loop means having means for normally providing an output signal in phase with said harmonic component;
   coincidence circuit means having first and second inputs for receiving said gate output from said first phase locked loop means and said output signal from said second phase locked loop means, and an output at which an output signal is produced upon a coincidence of said gate output and said output signal;
   a source of pulses;
   means for counting said pulses;
   register means coupled with said counting means for receiving and storing the contents of said counting means, said output of said coincidence circuit means being coupled to said register means to apply said output signal thereto to control the transfer of the contents of said counting means to said register means;
   detector means for receiving said reference signal and producing an output pulse in response thereto; and
   means coupling said detector means to said counting means whereby said output pulse resets said counter.

8. The system as in claim 7 wherein:
said detector means comprises third phase locked loop means for locking with said series of pulses.

9. The system as in claim 7 including:
selecting means operable to lock said second phase locked loop means onto said fundamental component in the event said harmonic component is not present.

10. The system as in claim 9 including:
amplitude detecting means for operating said selecting means when the amplitude of said harmonic component falls below a predetermined level.

11. The system as in claim 10 including
means coupled to said first phase locked loop means for generating an output signal having the same frequency as said harmonic component, said means being also coupled to said selecting means.

12. The system as in claim 10 including:
means coupled to said second phase locked loop means for generating an output signal having the same frequency as said fundamental component, said means being also coupled to said selector means.

13. A system for measuring the phase angles of signal components of a composite waveform comprising:
   an input terminal for receiving said composite waveform;
   first phase locked loop means having an input connected to said input terminal for receiving said composite waveform and for locking with a first signal component thereof, said first phase locked loop means having means for providing a gate output pulse which exists in time with a positive going zero crossing of said first signal component;
   second phase locked loop means having an input connected with said input terminal for receiving said composite waveform and for normally locking with the second signal component thereof, said second phase locked loop means normally providing an output signal in phase with said second component;

amplitude detecting means coupled with said input terminal and said second phase locked loop means and responsive to said second signal component and said output signal from said second phase locked loop, said amplitude detecting means providing a control signal;

logic gate means coupled with said first and second phase locked loop means and responsive to said gate output pulse and said output signal for providing a zero crossing signal; and second gate means coupled with said amplitude detecting means and controlled by the control signal therefrom to pass said zero crossing signal to an output terminal.

14. A system as in claim 13 wherein:

said second phase locked loop means includes gate means responsive to the control signal of said amplitude detecting means for causing said second phase locked loop means to selectively lock with said first signal component unless said second signal component exists for a predetermined time.

15. A system as in claim 14 wherein:

said first phase locked loop means includes an output coupled with said second gate means for supplying output signals in phase with said first signal component to said second gate means, and said second gate means passing said output signals of said first phase locked loop to the output thereof rather than said zero crossing signal when said amplitude detecting means provides a predetermined control signal, said predetermined control signal being indicative of the loss of said second signal component from said composite waveform.

16. A system as in claim 13 including:

counting means having a reset input adapted to receive a reset signal at a reference time to reset said counting means, and having a count input;

said second phase locked loop having a second output coupled with the count input of said counting means; and register means coupled with said counting means for receiving and storing the contents of said counting means, said output of said second gate means being coupled to said register means to apply said zero crossing signal thereto to control the transfer of the contents of said counting means to said register means.

17. A system as in claim 16 including:

third phase locked loop means having an input responsive to reference pulses having a time relation with respect to said composite waveform, and having an output for supplying said reset signal to said counting means.

18. A system for measuring the phase angles of signal components of a composite waveform comprising:

first means for receiving said composite waveform and for tracking a first signal component thereof, said first means providing an output in phase with said first signal component and providing a gate output pulse existing during a positive going zero crossing of said first signal component;

second means for receiving said composite waveform and for tracking a second signal component thereof or the first signal component thereof depending upon a control signal applied thereto, said second means providing a first output which is *n* times the frequency of the first signal component and providing a second output, *n* being equal to the ratio of frequencies of said second signal component to said first signal component;

third means for receiving said composite waveform and coupled with said second means and responsive to said second signal component and the first output signal of said second means, said third means providing said control signal; and gate means coupled with said first and second means for providing signals indicative of positive going zero crossings of said first signal component, said third means being coupled to said gate means for controlling the operation thereof.

19. A system as in claim 18 wherein:

said gate means includes a first gate coupled with said first and second means for receiving the gate output of said first means and the first output of said second means for providing a zero crossing signal, and a second gate coupled with the output of said first gate and said third means for receiving and passing said signals indicative of positive going zero crossings under the control of said control signal from said third means.

20. A system as in claim 19 wherein:

said output of said first means providing an output in phase with said first signal component is coupled with said second gate, and said second gate passes either said output from said first means or said output of said first gate depending upon said control signal.

21. A system as in claim 20 wherein:

said second means includes a phase locked loop and a third gate in the feedback loop thereof, said third gate causing said loop to lock on said second signal component when said second signal component exists for a predetermined time as indicated by a control signal of a first value from said third means, and causes said loop to lock with said first signal component when said control signal from said third means is different in value.

22. A system as in claim 20, including:

counting means;

reference circuit means coupled with said counting means for resetting said counting means at a reference time;

means coupling said second output of said second means to said counting means and said counting means counting said second output of said second means; and means coupling said signals indicative of positive going zero crossings from said second gate to control the readout of said counting means.

23. A navigation system for measuring the bearing between two relatively movable objects, a first of said objects generating a bearing signal comprising a composite waveform and generating a reference signal, said system being carried by a second of said objects with said system including means to receive said signals and means for measuring the phase angles of signal components of the composite waveform comprising:

first means for receiving said composite waveform and for tracking a first signal component thereof, said first means providing a gate output pulse existing during a positive going zero crossing of said first signal component;

second means for receiving said composite waveform and for tracking a second signal component thereof or the first signal component thereof depending upon a control signal applied thereto, said second means providing first and second output signals;

third means for receiving said composite waveform and coupled with said second means for providing said control signal;

gate means coupled to receive the gate output pulse of said first means and coupled with the first output of said second means for providing signals indicative of positive going zero crossings of said first signal component, said third means being coupled to said gate means for controlling the operation thereof;

reference circuit means and counting means, said reference circuit means being responsive to said reference signal for controlling said counting means, said counting means being coupled with the second output of said second means for counting the signals therefrom; and means coupling said signals indicative of positive going zero crossings from said gate means to control the readout of said counting means.

24. A system as in claim 23 wherein:

said reference circuit means resets said counting means at a reference time and said counting means counts the signals from the second output of said second means; and the output of said gate means causes said counting means to be readout, the contents of said counting means readout being indicative of the bearing between said two objects.

25. A system for measuring the phase angles of signal components of a composite waveform comprising:

an input terminal for receiving said composite waveform;

first phase locked loop means having an input connected to said input terminal for receiving said composite waveform and for locking with a first signal component thereof, said first phase locked loop means having means for providing a gate output pulse which exists in time with a positive going zero crossing of said first signal component;

second phase locked loop means having an input for normally locking with the second signal component of said composite waveform, said second phase locked loop means normally providing an output signal in phase with said second component;

amplitude detecting means coupled with said input terminal and said second phase locked loop means and responsive to said second signal component and said output signal from said second phase locked loop, said amplitude detecting means providing a control signal;

means coupled to said first phase locked loop means for developing a signal having the same frequency as said second signal component;

selector means having inputs coupled to said input terminal and said signal developing means and an output coupled to the input of said second phase locked loop means, said selector means being controlled by said control signal to couple one of the inputs thereto to the output thereof; and logic gate means coupled with said first and said second phase locked loop means and responsive to said gate output pulse and said output signal for providing a zero crossing signal.

26. A system as in claim 25 wherein:

said selector means comprises means responsive to the control signal of said amplitude detecting means for causing said signal developing means to be coupled to said second phase locked loop means unless said second signal component exists for a predetermined time.

27. A system as in claim 25 including:

counting means having a reset input adapted to receive a reset signal at a reference time to reset said counting means, and having a count input;

said second phase locked loop having a second output coupled with the count input of said counting means; and register means coupled with said counting means for receiving and storing the contents of said counting means, said output of said logic gate means being coupled to said register means to apply said zero crossing signal thereto to control the transfer of the contents of said counting means to said register means.

28. A system as in claim 27 including:

third phase locked loop means having an input responsive to reference pulses having a time relation with respect to said composite waveform, and having an output for supplying said reset signal to said counting means.

29. A bearing computing system for determining the bearing of a vehicle from a TACAN beacon or the like generating a composite bearing waveform having fundamental and harmonic components and a reference signal, comprising:

means for detecting said composite bearing waveform;

generating means coupled to said detecting means for generating waveforms distinct from but corresponding to the fundamental and harmonic components of said composite bearing waveform;

coincidence means for producing an output signal upon the coincidence of predetermined points of said generated waveforms;

a source of pulses;

counting means for counting said pulses;

means coupled to said coincidence means and to said counting means for detecting the count in said counting means upon the production of said output signal;

means for detecting said reference signal; and means coupling said reference signal detecting means to said counting means for resetting said counting means upon detection of said reference signal.

30. The system as in claim 29 wherein:

said predetermined points correspond to the positive going zero crossings of said components.

31. The system as in claim 29 wherein:

said count detecting means comprises register means coupled with said counting means, the output signal of said coincidence means causing the transfer of the contents of said counting means to said register means.

32. A system for measuring the phase angles of first and second signal components of a composite waveform comprising:

first means for receiving said composite waveform and for tracking a first signal component thereof, said first means providing a first output in phase with said first signal component, and providing a second output which has the same frequency as said second signal component, and providing a gate output pulse existing during a positive going zero crossing of said first signal component;

second means for receiving said composite waveform and for tracking said second signal component thereof or the second output of said first means depending upon a control signal applied thereto, said second means providing an output signal;

third means for receiving said composite waveform and coupled with said second means and responsive to said second signal component and said output signal of said second means, said third means providing said control signal; and gate means coupled with said gate output pulse of said first means and said output signal of said second means for providing signals indicative of positive going zero crossings of said first and second signal components.

33. The system as in claim 32 wherein:

said first means comprises a first phase locked loop and divider means coupled to said first phase locked loop for providing said second output;

said second means comprises a second phase locked loop including means for producing a series of pulses at a frequency substantially greater than the frequency of said second signal component;

said second means further comprising selector means having a pair of inputs respectively coupled to said composite waveform and said second output of said first means, said selector means being operable in response to said control signal to connect either of its inputs to said second phase locked loop;

said third means comprises amplitude detecting means for causing said selector means to connect said second output of said first means to said second phase locked loop when said second signal component is below a predetermined level.

34. The system of claim 33 including:
counting means coupled to said means for producing a series of pulses;
reference circuit means coupled with said counting means for resetting said counting means at a reference time; and
means coupling said output of said gate means to said counting means to control the readout of said counting means.

35. The system of claim 34 wherein:
said reference circuit means comprises a third phase locked loop for tracking a reference signal transmitted with said composite waveform.

References Cited
UNITED STATES PATENTS

| | | |
|---|---|---|
| 3,200,340 | 8/1965 | Dunne. |
| 3,209,254 | 9/1965 | Hossmann. |
| 3,229,203 | 1/1966 | Minohara. |
| 3,332,080 | 7/1967 | Verney _____________ 343—106 |
| 3,349,400 | 10/1967 | Asher et al. ________ 343—106 |

RODNEY D. BENNETT, JR., Primary Examiner

MALCOLM F. HUBLER, Assistant Examiner